US008923218B2

(12) United States Patent
Luo et al.

(10) Patent No.: US 8,923,218 B2
(45) Date of Patent: Dec. 30, 2014

(54) APPARATUS AND METHOD FOR RANDOM ACCESS SIGNALING IN A WIRELESS COMMUNICATION SYSTEM

(75) Inventors: Tao Luo, San Diego, CA (US); Wanshi Chen, San Diego, CA (US); Juan Montojo, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 12/917,359

(22) Filed: Nov. 1, 2010

(65) Prior Publication Data

US 2011/0268049 A1 Nov. 3, 2011

Related U.S. Application Data

(60) Provisional application No. 61/257,411, filed on Nov. 2, 2009, provisional application No. 61/331,792, filed on May 5, 2010.

(51) Int. Cl.
*H04W 4/00* (2009.01)
*H04W 74/08* (2009.01)
*H04B 7/06* (2006.01)
*H04B 7/04* (2006.01)
*H04W 74/00* (2009.01)

(52) U.S. Cl.
CPC ......... *H04B 7/0413* (2013.01); *H04W 74/0833* (2013.01); *H04B 7/0613* (2013.01); *H04W 74/002* (2013.01)
USPC ............ 370/329; 370/431; 455/434; 455/450

(58) Field of Classification Search
None
See application file for complete search history.

(56) References Cited

U.S. PATENT DOCUMENTS

| 8,014,361 | B2* | 9/2011 | Ozluturk | 370/335 |
|---|---|---|---|---|
| 8,107,445 | B2* | 1/2012 | Lee et al. | 370/336 |
| 8,165,097 | B2* | 4/2012 | Yi et al. | 370/334 |
| 8,369,300 | B2* | 2/2013 | Kim et al. | 370/344 |
| 2003/0041242 | A1 | 2/2003 | Patel | |
| 2005/0266846 | A1* | 12/2005 | Kim | 455/436 |

(Continued)

FOREIGN PATENT DOCUMENTS

| JP | 2004194262 A | 7/2004 |
|---|---|---|
| JP | 2007507969 A | 3/2007 |

(Continued)

OTHER PUBLICATIONS

International Search Report and Written Opinion—PCT/US2010/055149, International Search Authority—European Patent Office—Mar. 3, 2011.

(Continued)

*Primary Examiner* — Brian Roberts
(74) *Attorney, Agent, or Firm* — Liem T. Do

(57) ABSTRACT

An apparatus and method for providing random access signaling in a multiple input multiple output (MIMO) wireless communication system are provided. The apparatus and method determine a random access transmission scheme for the MIMO communication system based at least in part on a number of transmit antennas in the system. The random access signals are transmitted in a random access channel using the random access transmission scheme. Power control for the random access channel is performed based at least in part on the random access transmission scheme.

29 Claims, 7 Drawing Sheets

(56) References Cited

U.S. PATENT DOCUMENTS

| | | | |
|---|---|---|---|
| 2008/0043671 A1* | 2/2008 | Moon et al. | 370/329 |
| 2009/0163211 A1 | 6/2009 | Kitazoe et al. | |
| 2009/0175161 A1* | 7/2009 | Yi et al. | 370/210 |
| 2009/0175220 A1* | 7/2009 | Yi et al. | 370/328 |
| 2010/0216483 A1* | 8/2010 | Tynderfeldt et al. | 455/450 |
| 2010/0296467 A1* | 11/2010 | Pelletier et al. | 370/329 |
| 2011/0019694 A1* | 1/2011 | Kwon et al. | 370/474 |
| 2011/0287776 A1* | 11/2011 | Vujcic | 455/452.1 |

FOREIGN PATENT DOCUMENTS

| | | |
|---|---|---|
| JP | 2009159377 A | 7/2009 |
| JP | 2009159618 A | 7/2009 |
| JP | 2009536806 A | 10/2009 |
| KR | 20090100205 A | 9/2009 |
| WO | WO-2005032001 A1 | 4/2005 |
| WO | 2007120019 A1 | 10/2007 |
| WO | WO-2007133652 A2 | 11/2007 |
| WO | WO-2008101053 A2 | 8/2008 |
| WO | WO-2008101055 | 8/2008 |
| WO | WO-2009058065 A1 | 5/2009 |
| WO | WO-2009087182 A2 | 7/2009 |
| WO | WO-2009099151 A1 | 8/2009 |
| WO | WO-2009116819 A2 | 9/2009 |

OTHER PUBLICATIONS

Taiwan Search Report—TW099137660—TIPO—Jun. 13, 2013.

* cited by examiner

APPARATUS AND METHOD FOR RANDOM ACCESS SIGNALING IN A WIRELESS COMMUNICATION SYSTEM

CROSS REFERENCE TO RELATED APPLICATIONS

This application claims priority to U.S. Provisional Patent Application No. 61/257,411, filed on Nov. 2, 2009, and U.S. Provisional Patent Application No. 61/331,792, filed on May 5, 2010, herein incorporated by reference in their entirety.

FIELD

This application relates generally to multiple-access wireless communications. More particularly, but not exclusively, this application relates to techniques for supporting random access signaling in a multiple-access wireless communication system.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access ("CDMA") systems, time division multiple access ("TDMA") systems, frequency division multiple access ("FDMA") systems, 3GPP Long Term Evolution ("LTE") systems, and orthogonal frequency division multiple access ("OFDMA") systems.

Generally, a wireless multiple-access communication system can simultaneously support communications for multiple wireless terminals. Each terminal communicates with one or more base stations via transmissions on the forward and reverse links. The forward link (or downlink) refers to the communications link from the base stations to the terminals, and the reverse link (or uplink) refers to the communications link from the terminals to the base stations. This communications link may be established via a single-in-single-out, multiple-in-signal-out, or a multiple-in-multiple-out ("MIMO") system.

A MIMO system employs multiple ("$N_T$") transmit antennas and multiple ("$N_R$") receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports both time division duplex ("TDD") and frequency division duplex ("FDD") systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Generally, wireless cellular communication networks incorporate a number of mobile user equipments ("UEs") and a number of base nodes ("NodeBs"). A NodeB is generally a fixed station, and may also be called a base transceiver system ("BTS"), an access point ("AP"), a base station ("BS"), or some other equivalent terminology. As improvements to networks are made, the NodeB functionality has evolved, so a NodeB is sometimes also referred to as an evolved NodeB ("eNB"). In general, NodeB hardware, when deployed, is fixed and stationary, while UE hardware is portable.

In contrast to a NodeB, a mobile UE can comprise portable hardware. A UE, also commonly referred to as a terminal or a mobile station, may be a fixed or mobile device, and may be a wireless device, a cellular phone, a personal digital assistant ("PDA"), a wireless modem card, and so on. Uplink communication ("UL") refers to a communication from a mobile UE to a NodeB, whereas downlink ("DL") refers to a communication from a NodeB to a mobile UE.

Each NodeB contains radio frequency transmitter(s) and the receiver(s) used to communicate directly with the mobile UEs, which move freely around it. Similarly, each mobile UE contains radio frequency transmitter(s) and receiver(s) used to communicate directly with a NodeB. In cellular networks, the mobile UEs cannot communicate directly with each other but have to communicate with the NodeB.

Conventionally, for uplink transmission from UEs to a NodeB, only one transmit antenna is supported. While some conventional communication systems may provide features to enable antenna switching, generally only SIMO is supported for uplink transmissions, including for physical uplink channels such as the contention-based Physical Random Access Channel ("PRACH") that is used for random and initial access functions.

However, it is appreciated that by enabling MIMO transmission via multiple transmit antennas, various operations such as beamforming, MU-MIMO, SU-MIMO, and the like can be conducted, which can increase the overall throughout of the communication system. What is needed, therefore, is a way to support the use of multiple antennas for a contention-based channel such as PRACH in a MIMO system so that a UE can utilize beamforming, transmit diversity, and/or any other suitable measure for increasing throughout. The present application address these issues.

SUMMARY

This disclosure relates generally to apparatus and methods for providing random access signaling in a MIMO wireless communication system. A random access transmission scheme to be used for the MIMO communication system is determined based at least in part on a number of transmit antennas in the system. The random access signals are transmitted in a random access channel (e.g., PRACH) using the random access transmission scheme. Power control in the random access channel is performed based at least in part on the random access transmission scheme.

In one aspect, this disclosure relates to a method for facilitating MIMO communication in a wireless communication system. A random access transmission scheme to be used for the MIMO communication is determined based at least in part on a number of transmit antennas to be utilized for the MIMO communication. Random access signals are then transmitted using the random access transmission scheme.

In an aspect, this disclosure relates to an apparatus for wireless communication. The apparatus includes means for determining a random access transmission for a multiple input multiple output (MIMO) communication based at least in part upon a number of transmit antennas to be utilized for the MIMO communication; and means for transmitting random access signals using the random access transmission scheme.

In another aspect, this disclosure relates to a method for facilitating MIMO communication in a wireless communication system. A random access transmission scheme to be utilized by a plurality of user devices for the MIMO communication is determined. A random access request transmitted by one of the plurality of user devices is then received in accordance with the random access transmission scheme.

In an aspect, this disclosure relates to an apparatus for wireless communication. The apparatus includes means for determining a random access transmission scheme to be utilized by a plurality of user devices for a multiple input multiple output (MIMO) communication; and means for receiving a random access request from one of the plurality of user devices in accordance with the random access transmission scheme.

In yet another aspect, this disclosure relates to a method for facilitating MIMO communication in a wireless communication system. A random access transmission scheme to be used for the MIMO communication is determined based at least in part on a number of transmit antennas to be utilized for the MIMO communication. Transmit power control is then performed on a physical random access channel ("PRACH") as a function of the transmission scheme.

In a further aspect, this disclosure relates to an apparatus that facilitates MIMO communication in a wireless communication system. The apparatus includes a processor that is configured to determine a random access transmission scheme for the MIMO communication based at least in part on a number of transmit antennas to be utilized for the MIMO communication, and to transmit random access signals using the random access transmission scheme.

In another aspect, this disclosure relates to an apparatus that facilitates MIMO communication in a wireless communication system. The apparatus includes a processor that is configured to determine a random access transmission scheme to be utilized by a plurality of user devices for the MIMO communication, and to receive a random access request transmitted by one of the plurality of user devices in accordance with the random access transmission scheme.

In yet another aspect, this disclosure relates to a computer program product that facilitates MIMO communication in a wireless communication system and includes a computer-readable storage medium that includes instructions for causing at least one computer to determine a random access transmission scheme to be used for the MIMO communication based at least in part on a number of transmit antennas to be utilized for the MIMO communication and instructions for causing the at least one computer to transmit random access signals using the random access transmission scheme.

In yet another aspect, this disclosure relates to a computer program product that facilitates MIMO communication in a wireless communication system and includes a computer-readable storage medium that includes instructions for causing at least one computer to determine a random access transmission scheme to be utilized by a plurality of user devices for the MIMO communication; and instructions for causing the at least one computer to receive a random access request from one of the plurality of user devices in accordance with the random access transmission scheme.

The disclosure further relates to computer program products, devices, apparatus, and system for implementing the above-described methods, as well as others described herein. Various additional aspects are further described below in conjunction with the appended drawings.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
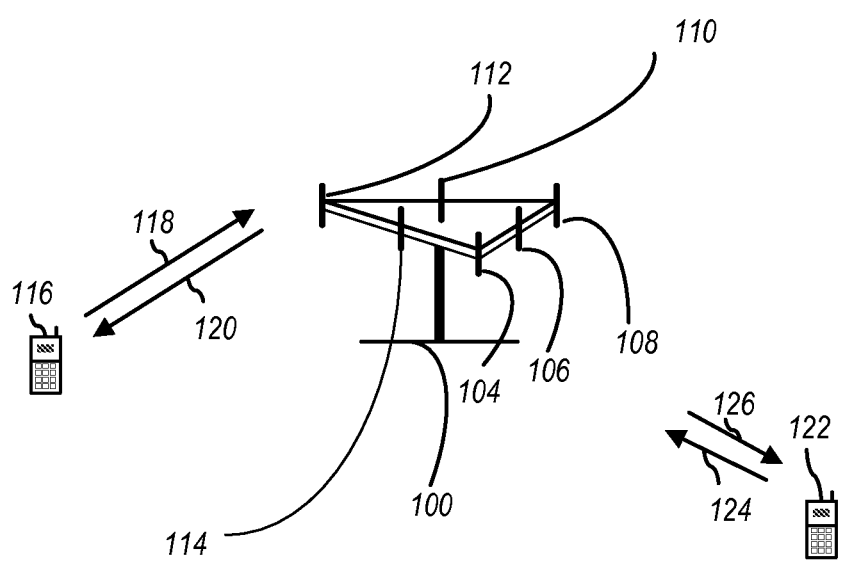
FIG. 1 illustrates a multiple access wireless communication system on which exemplary embodiments may be implemented.

Systems and methods are disclosed to facilitate wireless communications. The systems and methods support the use of multiple antennas for a contention-based channel such as PRACH in a MIMO system so that a UE can utilize beamforming, transmit diversity, and/or any other suitable measure for increasing throughout. The systems and methods allow a UE to be informed of a selected PRACH transmission scheme, and enable PRACH power control to be implemented as a function of the selected transmission scheme.

In various embodiments, beamforming is implemented by having a UE select a precoding vector from a predefined set of precoding vectors. For example, the UE can cycle through respective predefined precoding vectors (e.g., via beam sweeping) and/or select precoding vectors in any other suitable manner. For PRACH formats with a repeated preamble (e.g., format 2, format 3, etc.), the selection of precoding vectors can be applied per burst to maximize diversity. Transmit diversity can be provided in various forms, such as, for example, antenna selection, Time Switched Transmit Diversity ("TSTD"), and so on, and may or may not be transparent to the eNodeB.

In other embodiments, in the case of a non-transparent PRACH transmission scheme, a UE can be informed of a selection of a PRACH transmission scheme via, for example, a RAR grant, by re-using or adding one or more bits indicating the transmission scheme, or by using PDCCH for downlink data arrival, such as by re-interpreting one or more of the zero-padding bits indicating the transmission scheme. Alternatively, a transmission scheme to be utilized for PRACH can be pre-specified, hard-coded (e.g., in an associated network specification), and/or otherwise selected a priori.

Furthermore, PRACH power control can be implemented as a function of a selected transmission scheme. Thus, for example, parameters such as PREAMBLE_RECEIVED_TARGET_POWER can take the selected transmission scheme into account. Additionally or alternatively, an initial PUSCH power control can be a function of a selected transmission scheme. In another example, a power ramping step size during retransmissions can be a function of a utilized transmission scheme.

In various embodiments, the techniques described herein may be used for various wireless communication networks such as Code Division Multiple Access ("CDMA") networks, Time Division Multiple Access ("TDMA") networks, Frequency Division Multiple Access ("FDMA") networks, Orthogonal FDMA ("OFDMA") networks, Single-Carrier FDMA ("SC-FDMA") networks, as well as other communication networks. As described herein, the terms "networks" and "systems" are often used interchangeably.

A CDMA network may implement a radio technology such as Universal Terrestrial Radio Access ("UTRA"), CDMA2000, and the like. UTRA includes Wideband-CDMA ("W-CDMA") and Low Chip Rate ("LCR"). CDMA2000 covers IS-2000, IS-95 and IS-856 standards. A TDMA network may implement a radio technology such as Global System for Mobile Communications ("GSM").

An OFDMA network may implement a radio technology such as Evolved UTRA ("E-UTRA"), IEEE 802.11, IEEE 802.16, IEEE 802.20, Flash-OFDM, and the like. UTRA, E-UTRA, and GSM are part of Universal Mobile Telecommunication System ("UMTS"). In particular, Long Term Evolution ("LTE") is an upcoming release of UMTS that uses E-UTRA. UTRA, E-UTRA, GSM, UMTS and LTE are described in documents from an organization named "3rd Generation Partnership Project" ("3GPP"), and cdma2000 is described in documents from an organization named "3rd Generation Partnership Project 2" (3GPP2).

These various radio technologies and standards are known in the art. For clarity, certain aspects of the apparatus and methods are described below for LTE, and LTE terminology is used in much of the description below; however, the description is not intended to be limited to LTE applications. Accordingly, it is appreciated by one of skill in the art that the apparatus and methods described herein may be applied to various communications systems and applications.

Single carrier frequency division multiple access ("SC-FDMA"), which utilizes single carrier modulation and frequency domain equalization is one communications technique of interest. SC-FDMA has a similar performance and essentially the same overall complexity as OFDMA. However, an SC-FDMA signal has a lower peak-to-average power ratio ("PAPR") than an OFDMA signal because of its inherent single carrier structure. As a result, SC-FDMA has drawn great attention recently, especially for uplink communications where lower PAPR greatly benefits the mobile terminal in terms of transmit power efficiency. Use of SC-FDMA is currently a working assumption for uplink multiple access schemes in 3GPP Long Term Evolution ("LTE"), or E-UTRA.

Logical channels in wireless communications systems may be classified into Control Channels and Traffic Channels. Logical Control Channels may comprise a Broadcast Control Channel ("BCCH") which is a downlink ("DL") channel for broadcasting system control information, a Paging Control Channel ("PCCH") which is a DL channel that transfers paging information, and a Multicast Control Channel ("MCCH") which is a Point-to-multipoint DL channel used for transmitting Multimedia Broadcast and Multicast Service ("MBMS") scheduling and control information for one or several Multicast Traffic Channel(s) ("MTCHs"). Generally, after establishing a Radio Resource Control ("RCC") connection, this channel is only used by UEs that receive MBMS. Further, a Dedicated Control Channel ("DCCH") is a Point-to-point bi-directional channel that transmits dedicated control information and is used by UEs having an RRC connection.

Logical Traffic Channels may comprise a Dedicated Traffic Channel ("DTCH") which is a Point-to-point bi-directional channel, dedicated to one UE, for the transfer of user information, and a MTCH, which is a point-to-multipoint DL channel for transmitting traffic data.

Transport Channels may be classified into Downlink ("DL") and Uplink ("UL"). DL Transport Channels may comprise a Broadcast Channel ("BCH"), a Downlink Shared Data Channel ("DL-SDCH"), and a Paging Channel ("PCH"). The PCH may be used for support of UE power saving (e.g., when a DRX cycle is indicated by the network to the UE), broadcasted over entire cell and mapped to physical layer ("PHY") resources which can be used for other control/traffic channels. The UL Transport Channels may comprise a Random Access Channel ("RACH"), a Request Channel ("REQCH"), an Uplink Shared Data Channel ("UL-SDCH"), and a plurality of PHY channels. The PHY channels may comprise a set of DL channels and UL channels.

In addition, the DL PHY channels may comprise the following channels:
  Common Pilot Channel ("CPICH")
  Synchronization Channel ("SCH")
  Common Control Channel ("CCCH")
  Shared DL Control Channel ("SDCCH")
  Multicast Control Channel ("MCCH")
  Shared UL Assignment Channel ("SUACH")
  Acknowledgement Channel ("ACKCH")
  DL Physical Shared Data Channel ("DL-PSDCH")
  UL Power Control Channel ("UPCCH")
  Paging Indicator Channel ("PICH")
  Load Indicator Channel ("LICH")

The UL PHY channels may in turn comprise the following set of channels:
  Physical Random Access Channel ("PRACH")
  Channel Quality Indicator Channel ("CQICH")
  Acknowledgement Channel ("ACKCH")
  Antenna Subset Indicator Channel ("ASICH")
  Shared Request Channel ("SREQCH")
  UL Physical Shared Data Channel ("UL-PSDCH")
  Broadband Pilot Channel ("BPICH")

For the purposes of explanation or various embodiments, the following terminology and abbreviations may be used herein:
  AM Acknowledged Mode
  AMD Acknowledged Mode Data
  ARQ Automatic Repeat Request
  BCCH Broadcast Control Channel
  BCH Broadcast Channel
  C- Control-
  CCCH Common Control Channel
  CCH Control Channel
  CCTrCH Coded Composite Transport Channel
  CP Cyclic Prefix
  CRC Cyclic Redundancy Check
  CTCH Common Traffic Channel
  DCCH Dedicated Control Channel
  DCH Dedicated Channel
  DL Downlink
  DSCH Downlink Shared Channel
  DTCH Dedicated Traffic Channel
  DCI Downlink Control Information
  FACH Forward link Access Channel
  FDD Frequency Division Duplex
  L1 Layer 1 (physical layer)
  L2 Layer 2 (data link layer)
  L3 Layer 3 (network layer)
  LI Length Indicator
  LSB Least Significant Bit
  MAC Medium Access Control
  MBMS Multimedia Broadcast Multicast Service MCCH MBMS Point-to-Multipoint Control Channel
MRW Move Receiving Window
MSB Most Significant Bit
MSCH MBMS Point-to-Multipoint Scheduling Channel
MTCH MBMS Point-to-Multipoint Traffic Channel
PCCH Paging Control Channel
PCH Paging Channel
PDU Protocol Data Unit
PHY Physical Layer
PhyCH Physical Channels
RACH Random Access Channel
RLC Radio Link Control
RRC Radio Resource Control
SAP Service Access Point
SDU Service Data Unit
SHCCH Shared Channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
U- User-
UE User Equipment
UL Uplink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast Broadcast Single Frequency Network
MCE MBMS Coordinating Entity
MCH Multicast Channel
DL-SCH Downlink Shared Channel
MSCH MBMS Control Channel
PDCCH Physical Downlink Control Channel
PDSCH Physical Downlink Shared channel
PCFICH Physical Control Format Indicator Channel It is appreciated that the word "exemplary" is used herein to mean "serving as an example, instance, or illustration". Any embodiment described herein as "exemplary" is not necessarily to be construed as preferred or advantageous over other embodiments.

Referring now to FIG. 1, a multiple access wireless communication system according to one exemplary embodiment is illustrated. In various implementations, an access point ("AP"), such as AP 100 of FIG. 1, may be a fixed station used for communicating with access terminals and may be referred to as an access point, a NodeB, an eNodeB, a home eNodeB ("HeNB"), or by other terminology. An access terminal ("AT"), such as AT 116 or AT 122 of FIG. 1, may be called an access terminal, a user equipment ("UE"), a wireless communication device, terminal, access terminal, or by other terminology. ATs 116 and 122 and UE 100 may be configured to implement various aspects of embodiments as are described herein.

An access point 100 includes multiple antenna groups, one including 104 and 106, another including 108 and 110, and an additional including 112 and 114. In FIG. 1, only two antennas are shown for each antenna group; however, more or fewer antennas may be utilized for each antenna group in various embodiments.

Access terminal 116 is in communication with antennas 112 and 114, where antennas 112 and 114 transmit information to AT 116 over forward link 120 and receive information from AT 116 over reverse link 118. Access terminal 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequencies for communication between AP 100 and ATs 116 and 122. For example, forward link 120 may use a frequency that is different than that used by reverse link 118. Likewise, links 124 and 126 may use different frequencies from each other and/or from links 118 and 120.

Each group of antennas and/or the area in which they are designed to communicate may be referred to as a sector of the access point. In the illustrated exemplary embodiment, antenna groups are each designed to communicate with access terminals in a designated sector of the area covered by access point 100. For example, the antenna group including antennas 112 and 114 may be assigned to a sector designated as Sector 1 in FIG. 1, while the antenna group including antennas 106 and 108 may be assigned to a sector designated as Sector 2.

In communication over forward links 120 and 126, the transmitting antennas of access point 100 may be configured to utilize beamforming in order to improve the signal-to-noise ratio of forward links for the different access terminals 116 and 122, as well as others (not shown). Also, in typical implementations, an access point using beamforming to transmit to access terminals scattered randomly throughout its coverage area may cause less interference to access terminals in neighboring cells than an access point transmitting through a single antenna to all its access terminals. It is appreciated that precoding of transmit signals may be used to facilitate beamforming.

Figure 2:
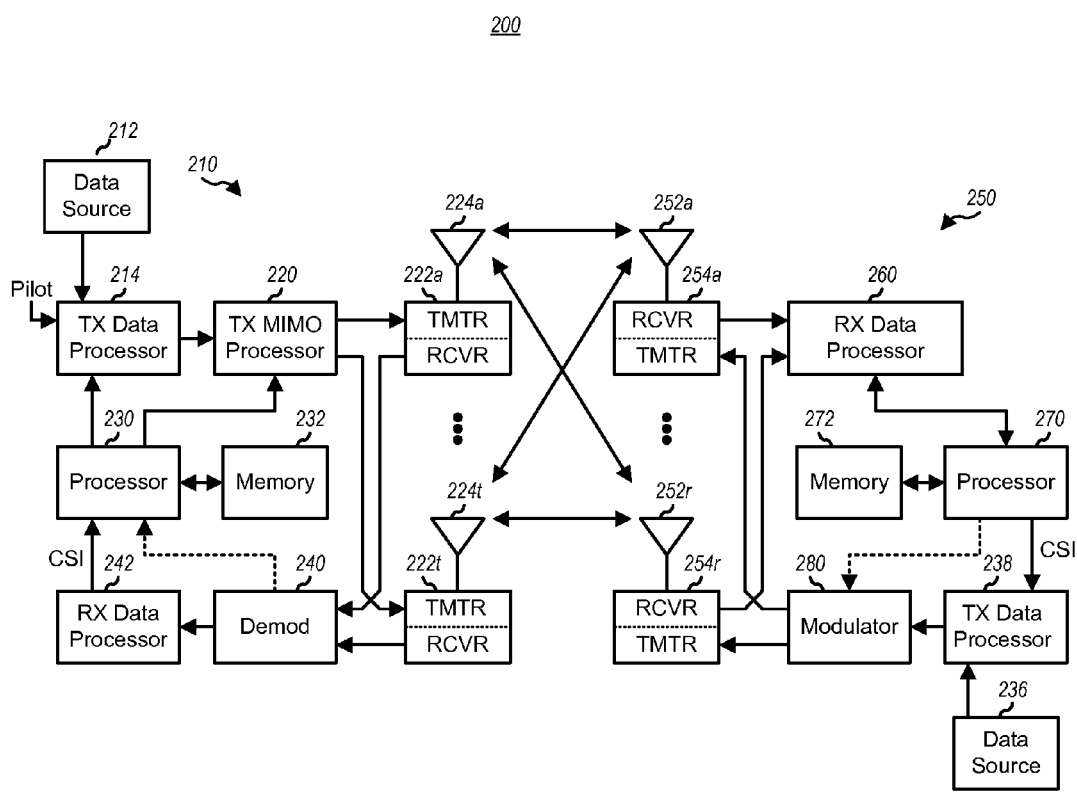
FIG. 2 illustrates a block diagram of an embodiment of a MIMO communication system.

Attention is now directed to FIG. 2, which illustrates a block diagram of an embodiment of a transmitter system 210 (i.e., an access point 210) and a receiver system 250 (i.e., an access terminal 250) in an exemplary MIMO system 200. It is appreciated that transmitter system 210 and receiver system 250 may correspond to AP 100 and ATs 116 and 122 of FIG. 1.

In operation, at the transmitter system 210, traffic data for a number of data streams may be provided from a data source 212 to a transmit ("TX") data processor 214, where it may be processed and transmitted to one or more receiver systems 250. In one embodiment, each data stream is processed and transmitted over a respective transmit antenna (e.g., antennas 224a-224t). TX data processor 214 receives, formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The pilot data may be provided to TX data processor 214 as shown in FIG. 2 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.), selected for that data stream so as to provide modulation symbols. The data rate, coding, and modulation for each data stream may be determined by instructions performed by processor 230 based on instructions stored in memory 232, or in other memory or instruction storage media of transmit system 250 (not shown).

The modulation symbols for all data streams may then be provided to a TX MIMO processor 220, which may further process the modulation symbols (e.g., for OFDM). TX MIMO processor 220 may then provide Nt modulation symbol streams to Nt transmitters ("TMTR") 222a through 222t. In certain embodiments, TX MIMO processor 220 may apply beamforming weights to the symbols of the data streams and corresponding to the one or more antennas from which the symbol is being transmitted.

Each transmitter sub-system 222a through 222t receives and processes a respective symbol stream to provide one or more analog signals, and further conditions (e.g., amplifies, filters, and upconverts) the analog signals to provide a modulated signal suitable for transmission over the MIMO channel. Nt modulated signals from transmitters 222a through 222t are then transmitted from Nt antennas 224a through 224t, respectively.

At receiver system 250, the transmitted modulated signals are received by Nr antennas 252a through 252r and the received signal from each antenna 252 is provided to a respective receiver ("RCVR") 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the Nr received symbol streams from Nr receivers 254a through 254r based on a particular receiver processing technique so as to provide Nt "detected" symbol streams. The RX data processor 260 then demodulates, deinterleaves, and decodes each detected symbol stream to recover the traffic data for the data stream. The processing by RX data processor 260 is typically complementary to that performed by TX MIMO processor 220 and TX data processor 214 in transmitter system 210.

A processor 270 may periodically determine a pre-coding matrix. Processor 270 may then formulate a reverse link message that may comprise a matrix index portion and a rank value portion. In certain embodiments, the reverse link message may comprise various types of information regarding the communication link and/or the received data stream. The reverse link message may then be processed by a TX data processor 238, which may also receive traffic data for a number of data streams from a data source 236, which may then be modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

It is appreciated that a channel structure may be used that preserves low PAPR (e.g., at any given time, the channel is contiguous or uniformly spaced in frequency) properties of a single carrier waveform. It is also appreciated that, as described in more detail herein below, transmit system 210 and receiver system 250 may be configured to support random access signaling (e.g., using PRACH and/or another suitable channel). In certain embodiments, various operations such as beamforming, transmit diversity, MU-MIMO, SU-MIMO, and the like can be conducted, which can increase the overall throughput of system 200.

Figure 3:
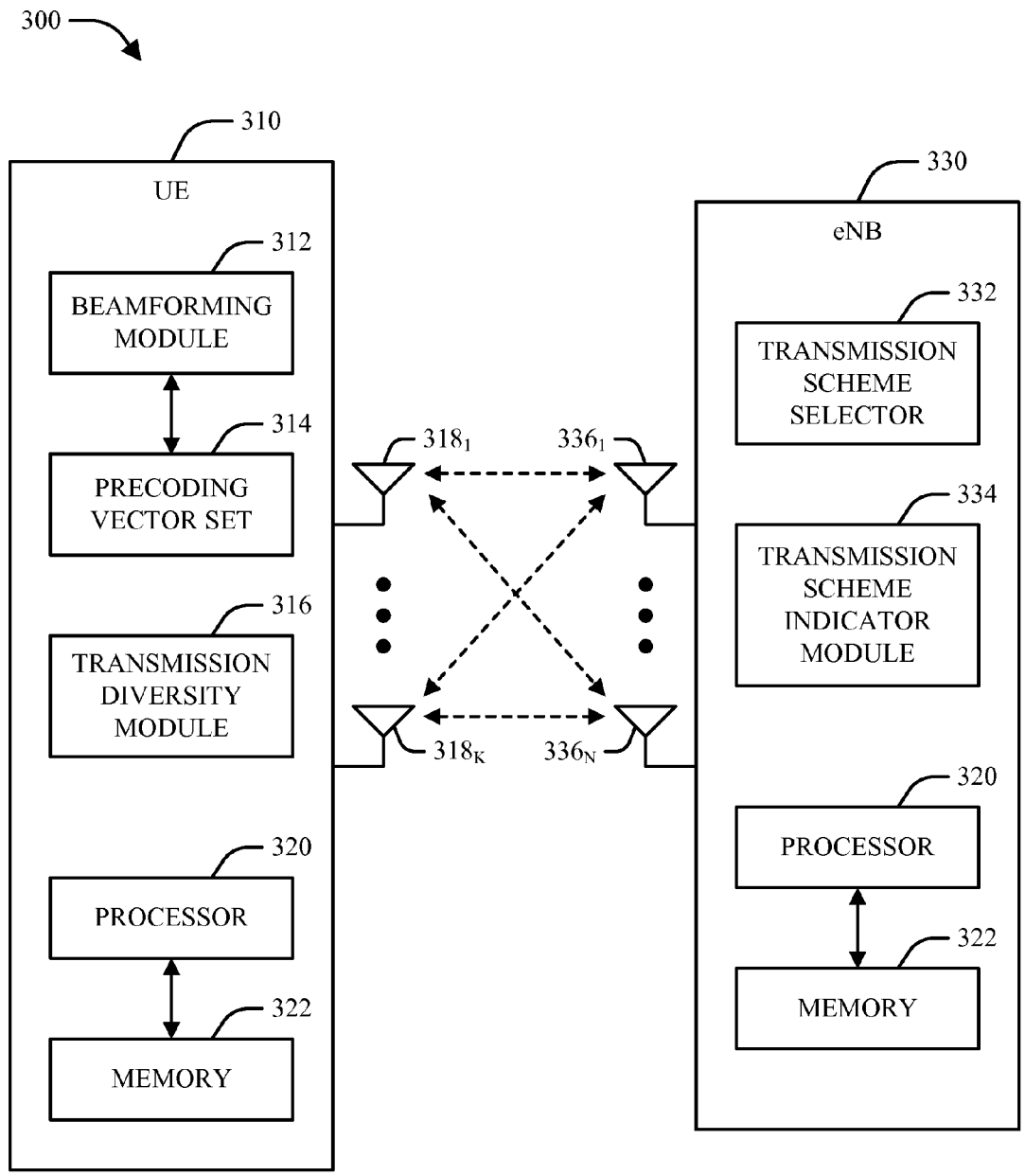
FIG. 3 illustrates a block diagram of a system for supporting PRACH communication in a wireless communication system.

Referring now to FIG. 3, a block diagram of a system for supporting PRACH communication in a wireless communication system is illustrated. System 300 can include one or more UEs 310, which can communicate with one or more eNBs 330 on an uplink and/or downlink via respective antennas 318 and/or 336. In one embodiment, UE 310 can communicate data, control signaling, and/or any other suitable information on the uplink to eNB 330. For example, UE 310 can utilize PRACH or a similar random access channel to transmit information to eNB 330. It is appreciated that PRACH can occupy any suitable amount of resources in time, frequency, and so on (e.g., 6 PRBs, or approximately 1 MHz in the case of 180 kHz PRBs).

It is appreciated that non-contention-based transmissions and/or other similar types of control or data transmissions (e.g., PUSCH transmissions) generally differ from contention-based PRACH transmissions. For example, in a non-contention-based transmission such as PUSCH, a UE can be informed a priori of information relating to a transmission scheme to be utilized, based on which an associated eNB can instruct or command the UE to utilize a specified transmission scheme. However, as contention-based transmissions such as PRACH does not leverage pre-coordination in this manner, it is appreciated that various techniques are desirable for adapting MIMO transmission schemes traditionally utilized for non-contention-based transmission to contention-based transmission.

In certain embodiments, to support the use of multiple antennas $318_1$-$318_k$ for a contention-based channel such as PRACH, UE 310 can utilize beamforming, transmit diversity, and/or any other suitable measure(s). For example, in one embodiment, UE 310 can include a beamforming module 312, which can facilitate adapted beamforming to enable the use of PRACH in a multi-antenna UE 310. In one embodiment, beamforming module 312 can operate in a manner transparent to an associated eNB 330 by, for example, selecting respective precoding vectors based at least in part on a number of transmit antennas $318_1$-$318_k$ associated with UE 310. These selected precoding vectors can subsequently be associated with a precoding vector set 314, from which beamforming module 312 can select one or more vectors for PRACH communication. In one embodiment, beamforming module 312 can additionally facilitate cycling or beam sweeping through respective vectors in precoding vector set 314.

UE 310 can also include a transmission diversity module 316, which can facilitate the implementation of various forms of transmit diversity based on a plurality of transmit antennas $318_1$-$318_k$ associated with UE 310. For example, transmission diversity module 316 can facilitate diversity via antenna selection, TSTD, or the like. In one embodiment, transmit diversity can be employed in the case of PRACH re-transmission, which can occur, e.g., in the case that UE 310 does not receive a response to random access signaling from eNB 330.

In particular, transmission diversity module 316 can facilitate various adjustments for successive re-transmissions, such as antenna selection adjustments, transmit diversity adjustments, power level adjustments, or the like, in order to maximize the efficiency of re-transmission to eNB 330. Such adjustments can be performed either transparently to or with the aid of eNB 330.

Figure 4:
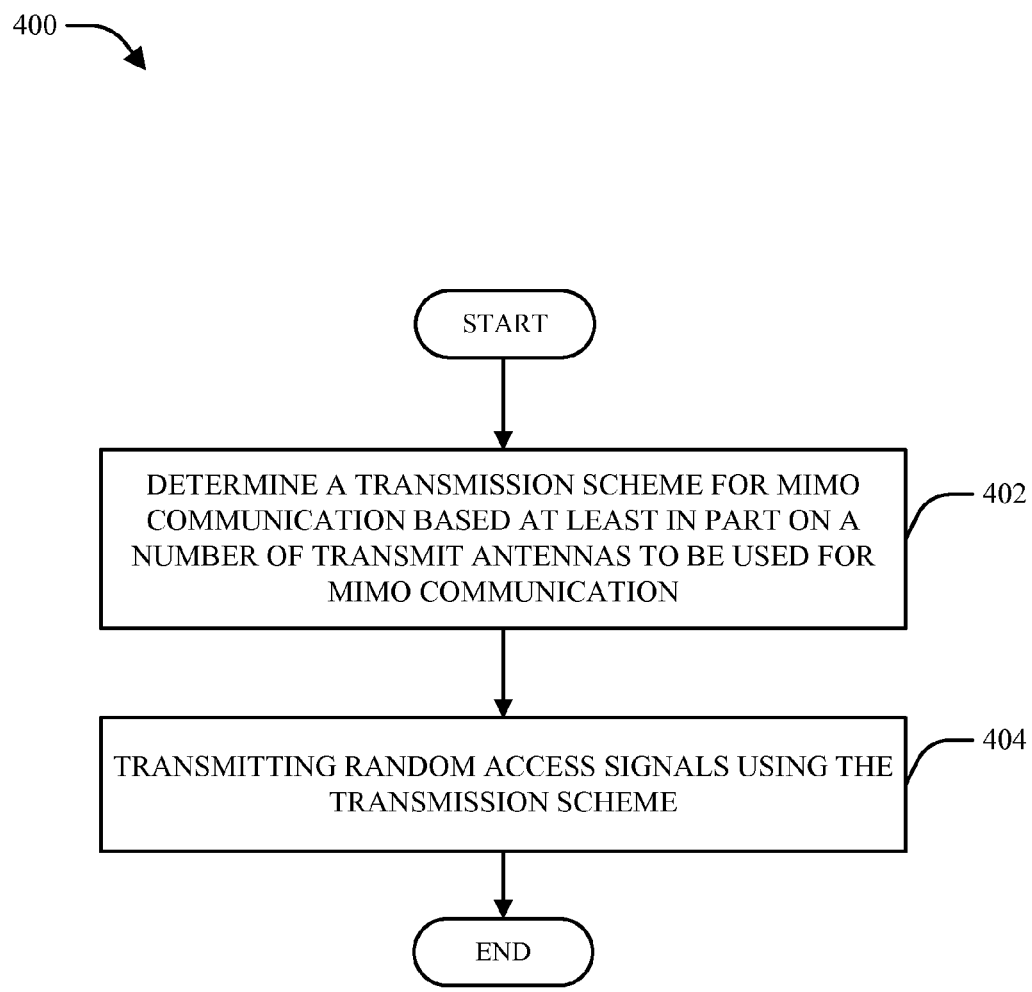
FIG. 4 illustrates a flowchart for facilitating uplink PRACH transmission in a multi-antenna communication system.

Accordingly, a flowchart for facilitating uplink PRACH transmission in a multi-antenna communication system is illustrated in FIG. 4. First, a random access transmission scheme is determined for a MIMO communication over a random access channel based at least in part on a number of associated transmit antennas (402). Random access signals are then transmitted using the random access transmission scheme (404).

Figure 5:
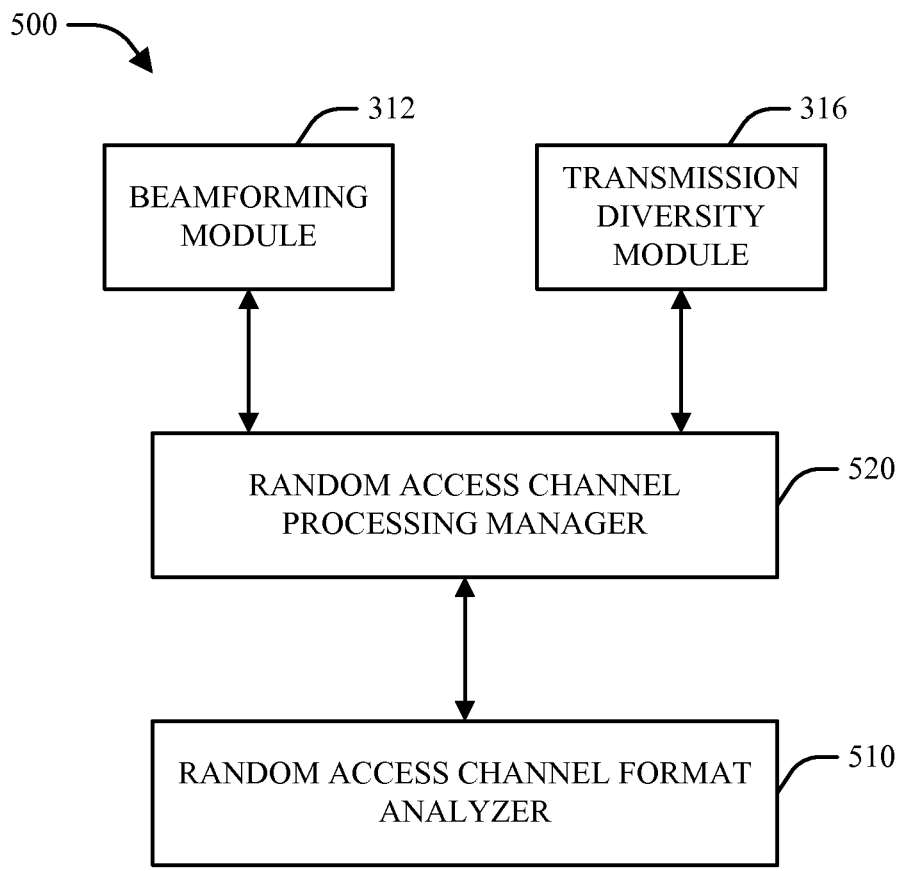
FIG. 5 illustrates a block diagram of a system that facilitates variable levels of PRACH support in a wireless communication system.

In a further example, processing of PRACH and/or other suitable random access channels can be performed based at least in part on a format associated with the random access channel(s). For example, as shown in system 500 in FIG. 5, a random access channel format analyzer 510 can be utilized to analyze and/or otherwise identify a format utilized by an associated random access channel. In turn, a random access channel processing manager 520 and/or other suitable means can be utilized to control one or more aspects of random access channel processing as described herein, such as beamforming via a beamforming module 312, antenna selection and/or other transmit diversity operations via a transmission diversity module 316, and so on, based on a random access channel format identified by random access channel format analyzer 510. For example, for random access channel (e.g., PRACH) formats having a repeated preamble (e.g., PRACH format 2, PRACH format 3, etc.), selection of precoding vectors and/or antennas, and/or one or more other suitable operations in system 500, can be applied per burst to maximize diversity.

Returning to FIG. 3, in the case of a non-transparent and/or non-contention-based PRACH transmission scheme, UE 310 can be configured to synchronize with eNB 330 such that eNB 330 can pre-assign various resources to UE 310 for random access signaling. Thus, for example, eNB 330 can include a transmission scheme selector 332 for selecting a PRACH transmission scheme to be utilized by a given UE 310 and a transmission scheme indicator module 334 for indicating the selected transmission scheme to the UE 310.

In one example, a PRACH transmission scheme can be indicated to UE 310 by eNB 330 via a RAR grant (e.g., Message 2 in the conventional random access procedure, wherein Message 1 is a random access request, Message 2 is a RAR, Message 3 is a scheduled UL transmission, and Message 4 is a confirmation of Message 3). In one embodiment, a transmission scheme can be indicated in this manner by, for example, adding one or more bits to the RAR grant indicating the transmission scheme.

In another example, in the event that eNB 330 detects data arriving to an associated DL data buffer (e.g., via PDCCH), eNB 330 can initiate a PRACH procedure, in which case eNB 330 can instruct UE 310 to utilize non-contention-based PRACH and provide a related transmission scheme assignment to UE 310. In such an example, a transmission scheme can be indicated to UE 310 by re-interpreting one or more zero-padding bits to indicate the transmission scheme. Alternatively, it is appreciated that a transmission scheme can be hard-coded and/or otherwise specified a priori to substantially all devices in system 300 (e.g., via a network specification or the like).

Figure 6:
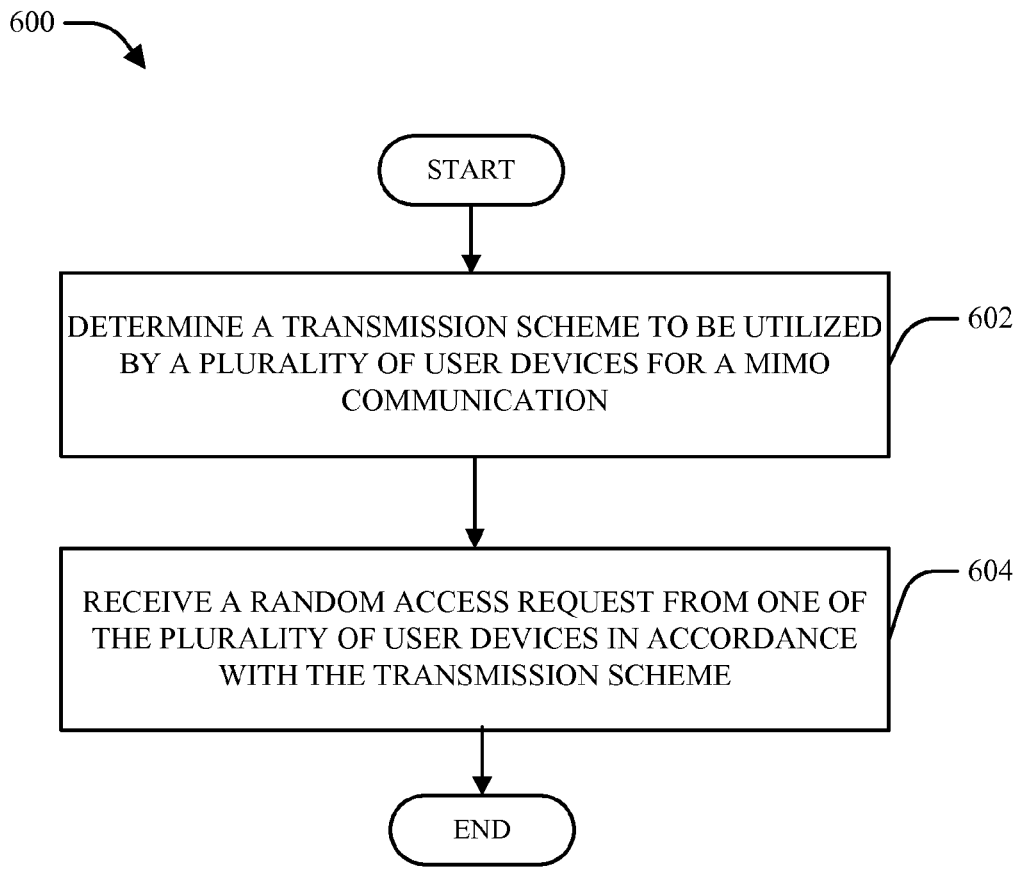
FIG. 6 illustrates a flowchart for facilitating signaling of a selected PRACH transmission scheme to an associated user device.

A flowchart for facilitating signaling of a selected PRACH transmission scheme to an associated user device is illustrated in FIG. 6. First, a random access transmission scheme is determined to be utilized by a plurality of user devices for a MIMO communication (602). A random access request transmitted by one of the plurality of user devices in accordance with the random access transmission scheme is then received (604).

In one embodiment, PRACH power control can be performed within system 300 as a function of a selected transmission scheme. For example, a PRACH parameter such as the PREAMBLE_RECEIVED_TARGET_POWER and/or another suitable parameter can be configured to take a selected transmission scheme into account. In one example, power control associated with an initial PUSCH transmission (e.g., following completion of an associated PRACH procedure) can additionally be conducted as a function of the selected PRACH transmission scheme. In another example, a power ramping step size utilized for successive PRACH retransmissions (e.g., as described above) can be a function of the utilized transmission scheme.

Figure 7:
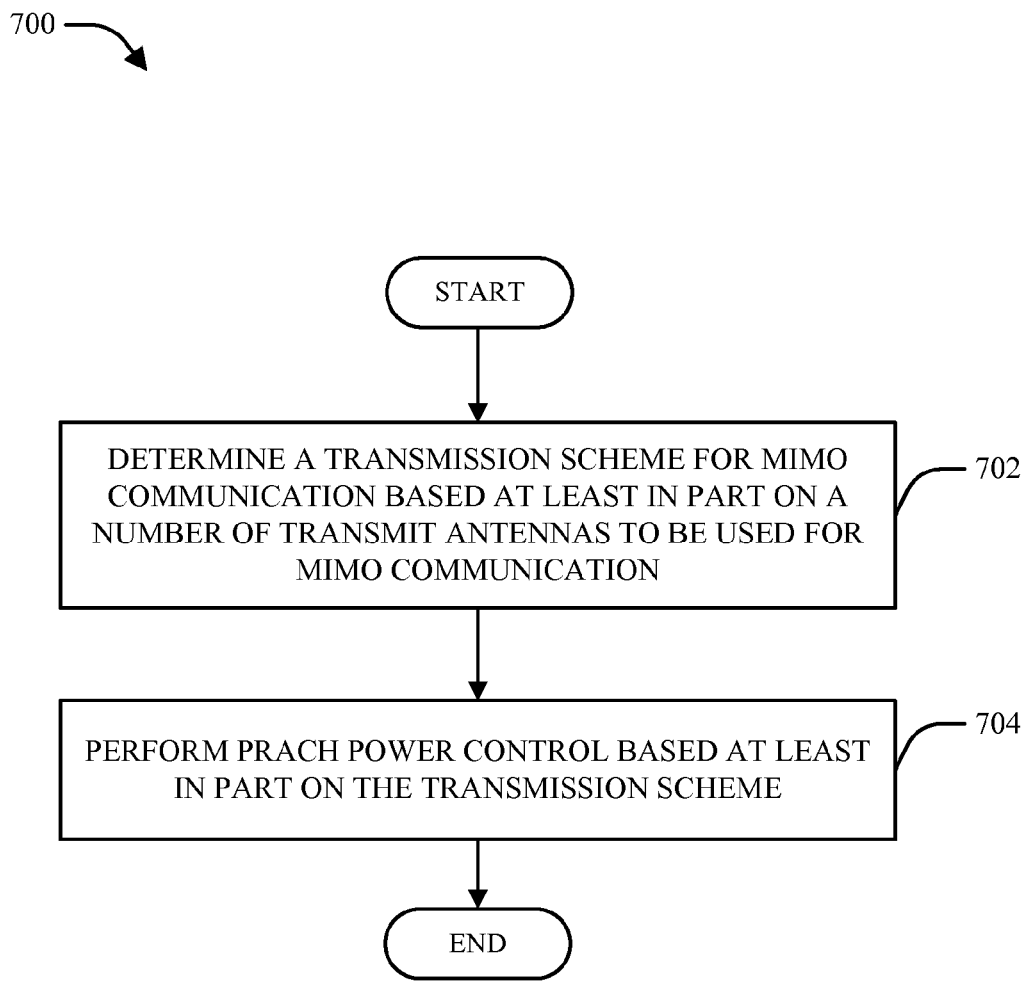
FIG. 7 illustrates a flowchart for performing PRACH power control in a MIMO communication system.

Accordingly, a flowchart for performing PRACH power control in a MIMO communication system is illustrated in FIG. 7. First, a random access transmission scheme is determined for a MIMO communication over a random access channel based at least in part on a number of associated transmit antennas (702). PRACH power control is then performed based at least in part on (e.g., as a function of) the random access transmission scheme (704).

Returning to FIG. 3, in certain embodiments, UE 310 can include a processor 320 and/or memory 322, which can be utilized to implement some or all of the functionality described above. Additionally or alternatively, eNB 330 can implement a processor 320 and/or memory 322 to implement various aspects of the above-described functionality.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communication, comprising:
   determining a random access transmission scheme at a user equipment (UE) for a multiple input multiple output (MIMO) communication based at least in part on a number of transmit antennas at the UE to be utilized for the MIMO communication, an identified format utilized by a random access channel, and a precoding vector that is selected based on the number of transmit antennas; and
   transmitting random access signals from the UE using the random access transmission scheme determined at the UE.

2. The method of claim 1, wherein the transmitting further comprises transmitting the random access signals over a contention-based random access channel.

3. The method of claim 2, wherein the random access transmission scheme employs beamforming.

4. The method of claim 3, wherein the determining further comprises selecting the precoding vector from a set of precoding vectors and using the precoding vector to generate the random access signals.

5. The method of claim 4, wherein the determining further comprises selecting at least one of the precoding vectors for communication over the random access channel on a per-burst basis if the random access channel utilizes the format associated with a repeated preamble.

6. The method of claim 5, wherein the format comprises at least one of a physical random access channel (PRACH) format 2 or PRACH format 3.

7. The method of claim 2, wherein the MIMO communication includes random access re-transmission.

8. The method of claim 2, wherein the determining is based at least in part on the format of the random access channel.

9. The method of claim 1, wherein the random access transmission scheme comprises a transmit diversity scheme.

10. The method of claim 9, wherein the transmit diversity scheme comprises time switched transmit diversity (TSTD).

11. The method of claim 1, wherein the determining comprises receiving an indication of the random access transmission scheme.

12. The method of claim 11, wherein the random access transmission scheme comprises a non-contention-based transmission scheme.

13. The method of claim 11, wherein the determining comprises receiving a random access response (RAR) grant message containing the indication.

14. The method of claim 11, wherein the determining comprises receiving a control channel conveying the indication.

15. The method of claim 14, wherein the indication is conveyed using one or more zero-padding bits.

16. The method of claim 1, further comprising performing transmit power control for a physical random access channel based at least in part on the random access transmission scheme.

17. An apparatus for wireless communication, comprising:
    means for determining a random access transmission at a user equipment (UE) for a multiple input multiple output (MIMO) communication based at least in part upon a number of transmit antennas at the UE to be utilized for the MIMO communication, an identified format utilized by a random access channel, and a precoding vector that is selected based on the number of transmit antennas; and
    means for transmitting random access signals from the UE using the random access transmission scheme determined at the UE.

18. The apparatus of claim 17, wherein the means for transmitting further comprises means for transmitting the random access signals over a contention-based random access channel.

19. The apparatus of claim 17, wherein the means for transmitting comprises at least one of means for beamforming or means for transmit diversity.

20. The apparatus of claim 19, wherein the means for beamforming further comprises means for selecting the precoding vector from a set of precoding vectors and means for using the precoding vector to generate the random access signals.

21. The apparatus of claim 20, wherein the means for beamforming further comprises means for selecting at least one of the precoding vectors for communication over a random access channel on a per-burst basis if the random access channel utilizes the format associated with a repeated preamble.

22. The apparatus of claim 19, wherein the means for transmit diversity comprises means for implementing a time switched transmit diversity (TSTD) scheme.

23. The apparatus of claim 17, further comprising means for performing transmit power control for a physical random access channel based at least in part on the random access transmission scheme.

24. An apparatus for wireless communication, comprising:
    a processor configured to:
        determine a random access transmission scheme at a user equipment (UE) for a multiple input multiple output (MIMO) communication based at least in part on a number of transmit antennas at the UE to be utilized for the MIMO communication, an identified format utilized by a random access channel, and a precoding vector that is selected based on the number of transmit antennas; and
        transmit random access signals from the UE using the random access transmission scheme determined at the UE.

25. The apparatus of claim 24, wherein the processor is further configured to perform transmit power control for a physical random access channel based at least in part on the random access transmission scheme.

26. A computer program product that facilitates a multiple input multiple output (MIMO) communication in a wireless communication system, comprising:
   a non-transitory computer-readable storage medium comprising:
      instructions for causing at least one computer to determine a random access transmission scheme at a user equipment (UE) for the MIMO communication based at least in part on a number of transmit antennas at the UE to be utilized for the MIMO communication, an identified format utilized by a random access channel, and a precoding vector that is selected based on the number of transmit antennas; and
      instructions for causing the at least one computer to transmit random access signals from the UE using the random access transmission scheme determined at the UE.

27. The computer program product of claim 26, wherein the random access transmission scheme employs beamforming.

28. The computer program product of claim 26, wherein the random access transmission scheme comprises a transmit diversity scheme.

29. The computer program product of claim 26, wherein the computer-readable storage medium further comprises instructions for causing the at least one computer to perform transmit power control for a physical random access channel based at least in part on the random access transmission scheme.

* * * * *